US012652707B2

(12) United States Patent
Liu et al.

(10) Patent No.: US 12,652,707 B2
(45) Date of Patent: Jun. 9, 2026

(54) TRAFFIC PRIORITY-BASED ENERGY DETECTION THRESHOLD ADAPTION IN UNLICENSED BAND

(71) Applicant: Nokia Technologies Oy, Espoo (FI)

(72) Inventors: Jianguo Liu, Shanghai (CN); Tao Tao, Shanghai (CN); Yan Meng, Shanghai (CN); Gang Shen, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 607 days.

(21) Appl. No.: 17/997,049

(22) PCT Filed: May 8, 2020

(86) PCT No.: PCT/CN2020/089127
§ 371 (c)(1),
(2) Date: Oct. 25, 2022

(87) PCT Pub. No.: WO2021/223201
PCT Pub. Date: Nov. 11, 2021

(65) Prior Publication Data
US 2023/0171816 A1 Jun. 1, 2023

(51) Int. Cl.
*H04W 74/08* (2024.01)
*H04W 72/566* (2023.01)
*H04W 74/0833* (2024.01)

(52) U.S. Cl.
CPC ..... *H04W 74/0875* (2013.01); *H04W 72/569* (2023.01); *H04W 74/0858* (2013.01)

(58) Field of Classification Search
CPC ........... H04W 74/0875; H04W 72/569; H04W 74/0858; H04W 74/006; H04W 74/0808
See application file for complete search history.

(56) References Cited

U.S. PATENT DOCUMENTS 8,175,539 B2 5/2012 Diener et al.
10,104,692 B2 10/2018 Khawer et al.
(Continued)

FOREIGN PATENT DOCUMENTS

CN 106507498 A * 3/2017 ........ H04W 74/0833
CN 106559892 A 4/2017
(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
(Continued)

*Primary Examiner* — Sujoy K Kundu
*Assistant Examiner* — Samuel Dilan Rutnam
(74) *Attorney, Agent, or Firm* — Lippes Mathias LLP

(57) ABSTRACT

Example embodiments of the present disclosure relate to devices, methods, apparatuses and computer readable storage media of traffic priority-based energy detection threshold adaption in unlicensed band. The method comprises determining a target traffic priority for transmitting data from a first device to a second device; obtaining at least one candidate configuration parameter of an energy detection threshold for channel clearance assessment for the target traffic priority; determining a target configuration parameter for transmitting the data based on the at least one candidate configuration parameter; and transmitting the data to the second device based on the target configuration parameter. In this way, the maximum EDT can be associated with the traffic priority, to facilitate flexible channel access requirement of different uplink traffic priority.

19 Claims, 4 Drawing Sheets

(56) References Cited

U.S. PATENT DOCUMENTS

| | | | |
|---|---|---|---|
| 2017/0353972 A1 | 12/2017 | Babaei et al. | |
| 2018/0279386 A1 | 9/2018 | Liu et al. | |
| 2018/0288805 A1 | 10/2018 | Bhorkar et al. | |
| 2018/0376339 A1* | 12/2018 | Hu | H04W 16/14 |
| 2021/0410185 A1* | 12/2021 | Do | H04W 74/0808 |
| 2023/0189328 A1* | 6/2023 | Xu | H04W 72/569 |
| | | | 370/329 |

FOREIGN PATENT DOCUMENTS

| | | | |
|---|---|---|---|
| CN | 107734713 A | 2/2018 | |
| CN | 107852746 A | 3/2018 | |
| CN | 108029146 A | 5/2018 | |
| CN | 109891997 A | 6/2019 | |
| CN | 110100466 A | 8/2019 | |
| EP | 3539345 A1 | 9/2019 | |
| JP | 2017-537498 A | 12/2017 | |
| WO | 2016/057482 A1 | 4/2016 | |
| WO | 2017/026981 A1 | 2/2017 | |
| WO | 2018/086691 A1 | 5/2018 | |
| WO | 2019/195589 A1 | 10/2019 | |
| WO | WO-2019195465 A1 * | 10/2019 | H04W 72/0446 |
| WO | 2019/216705 A1 | 11/2019 | |
| WO | 2020/032725 A1 | 2/2020 | |
| WO | 2020/033381 A1 | 2/2020 | |
| WO | 2020/033941 A1 | 2/2020 | |
| WO | 2020/063061 A1 | 4/2020 | |
| WO | 2020/089709 A1 | 5/2020 | |
| WO | WO-2020089514 A1 * | 5/2020 | H04W 52/50 |

OTHER PUBLICATIONS

"New WID on enhanced Industrial Internet of Things (IoT) and URLLC support", 3GPP TSG RAN Meeting #86, RP-193233, Agenda: 9.1.2, Nokia, Dec. 9-12, 2019, 5 pages.

"5 Ghz RLAN; Harmonised Standard covering the essential requirements of article 3.2 of Directive 2014/53/EU", ETSI EN 301 893, V2.1.1, May 2017, pp. 1-122.

"3rd Generation Partnership Project; Technical Specification Group Radio Access Network; Physical layer procedures for shared spectrum channel access (Release 16)", 3GPP TS 37.213, V16.0.0, Dec. 2019, pp. 1-25.

"3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101, V16.4.0, Dec. 2019, 1882 pages.

International Search Report and Written Opinion received for corresponding Patent Cooperation Treaty Application No. PCT/CN2020/089127, dated Feb. 9, 2021, 9 pages.

"Coexistence and channel access for NR unlicensed band operations", 3GPP TSG RAN WG1 Meeting #99, R1-1911866, Agenda: 7.2.2.2.1, Huawei, Nov. 18-22, 2019, 18 pages.

"Discussion on channel access procedure", 3GPP TSG RAN WG1 #98bis, R1-1911052, Agenda: 7.2.2.2.1, MediaTek Inc, Oct. 14-20, 2019, pp. 1-24.

Office Action received for corresponding Chinese Patent Application No. 202080100490.6 dated Oct. 31, 2024, 6 pages of Office Action and no page of translation available.

Office Action received for corresponding Chinese Patent Application No. 202080100490.6 dated May 22, 2024, 10 pages of Office Action and no page of translation available.

"Channel access procedures for NR unlicensed", 3GPP TSG RAN WG1 Meeting #94bis, R1-1811252, Agenda: 7.2.2.4.1, Qualcomm Incorporated, Oct. 8-12, 2018, pp. 1-10.

Office Action received for corresponding Japanese Patent Application No. 2022-567584 dated Aug. 13, 2024, 6 pages of Office Action and 9 pages of summary available.

Office Action received for corresponding Japanese Patent Application No. 2022-567584 dated Nov. 21, 2023, 2 pages of Office Action and 3 pages of summary available.

Office action received for corresponding Indian Patent Application No. 202247070553, dated Feb. 7, 2023, 5 pages.

Extended European Search Report received for corresponding European Patent Application No. 20934279.9, dated Apr. 5, 2023, 11 pages.

Office action received for corresponding European Patent Application No. 20934279.9, dated Dec. 9, 2025, 7 pages.

* cited by examiner

TRAFFIC PRIORITY-BASED ENERGY DETECTION THRESHOLD ADAPTION IN UNLICENSED BAND

RELATED APPLICATION

This application was originally filed as PCT Application No. PCT/CN2020/089127 on May 8, 2020, each of which is incorporated herein by reference in its entirety.

FIELD

Embodiments of the present disclosure generally relate to the field of telecommunication and in particular, to devices, methods, and computer readable storage media of traffic priority-based energy detection threshold adaption in an unlicensed band.

BACKGROUND

Ultra-Reliable Low-Latency Communication (URLLC) service was introduced in 5G to support the use cases with stringent requirements for extremely low latency and high reliability. To comply with the regulatory requirement for unlicensed spectrum access, a User Equipment (UE) may perform a Listen Before Talk (LBT) operation before Uplink (UL) URLLC transmission. In the case where the detected energy level is higher than the maximum Energy Detection Threshold (EDT), the channel may be considered as being occupied and thus the channel access may be deferred until passing the LBT operation. Therefore, the setting of maximum EDT may have a large impact on the channel accessibility of a UE.

However, a large maximum EDT means small maximum output power for a UE according to the regulatory requirement. For URLLC, it makes sense to reduce the maximum output power for fast ED-based LBT operation. For example, the URLLC traffic with small data packet generally requires small transmission bandwidth and thus only needs low transmit power (per MHz) for reliable transmission especially for the cell-center UEs. Even if small maximum output power has an adverse impact on the link performance for some cases, other approaches such as link adaption or repetition transmission can be used to ensure the transmission reliability for URLLC traffic with few data. Therefore, it is reasonable to reduce the maximum output power of a UE for fast channel access operation under the constraint of regulatory requirement.

Unlike URLLC, other traffic such as Enhanced Mobile Broadband (eMBB) generally have large amount of data for transmission and need to occupy large channel bandwidth for UL transmission. For this, large maximum output power would be beneficial to improve the critical performance of the corresponding traffic, e.g. the throughput performance of eMBB traffic.

SUMMARY

In general, example embodiments of the present disclosure provide a solution of traffic priority-based energy detection threshold adaption in unlicensed band.

In a first aspect, there is provided a first device. The first device comprises at least one processor; and at least one memory including computer program codes; the at least one memory and the computer program codes are configured to, with the at least one processor, cause the first device at least to determine a target traffic priority for transmitting data from the first device to a second device; obtain at least one candidate configuration parameter of an energy detection threshold for channel clearance assessment for the target traffic priority; determine a target configuration parameter for the data transmission from the at least one candidate configuration parameter; and transmit the data to the second device based on the target configuration parameter.

In a second aspect, there is provided a second device. The second device comprises at least one processor; and at least one memory including computer program codes; the at least one memory and the computer program codes are configured to, with the at least one processor, cause the second device at least to in response to receiving, from a first device, data transmitted based on a target configuration parameter, determine a target traffic priority for transmitting the data based on the data, the target configuration parameter being associated with at least one candidate configuration parameter of an energy detection threshold for channel clearance assessment for the target traffic priority; and determine an output power level for the data transmission at least based on the target traffic priority.

In a third aspect, there is provided a method. The method comprises determining a target traffic priority for transmitting data from a first device to a second device; obtaining at least one candidate configuration parameter of an energy detection threshold for channel clearance assessment for the target traffic priority; determining a target configuration parameter for the data transmission from the at least one candidate configuration parameter; and transmitting the data to the second device based on the target configuration parameter.

In a fourth aspect, there is provided a method. The method comprises in response to receiving, from a first device and at a second device, data transmitted based on a target configuration parameter, determining a target traffic priority for transmitting the data based on the data, the target configuration parameter being associated with at least one candidate configuration parameter of an energy detection threshold for channel clearance assessment for the target traffic priority; and determining an output power level for the data transmission at least based on the target traffic priority.

In a fifth aspect, there is provided an apparatus comprises means for determining a target traffic priority for transmitting data from a first device to a second device; means for obtaining at least one candidate configuration parameter of an energy detection threshold for channel clearance assessment for the target traffic priority; means for determining a target configuration parameter for the data transmission from the at least one candidate configuration parameter; and means for transmitting the data to the second device based on the target configuration parameter.

In a sixth aspect, there is provided an apparatus comprises means for in response to receiving, from a first device and at a second device, data transmitted based on a target configuration parameter, determining a target traffic priority for transmitting the data based on the data, the target configuration parameter being associated with at least one candidate configuration parameter of an energy detection threshold for channel clearance assessment for the target traffic priority; and means for determining an output power level for the data transmission at least based on the target traffic priority.

In a seventh aspect, there is provided a computer readable medium having a computer program stored thereon which, when executed by at least one processor of a device, causes the device to carry out the method according to the third aspect or a fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
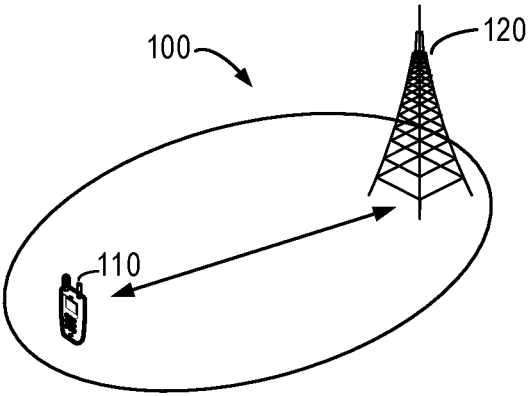
FIG. 1 shows an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a terminal device 110 (hereafter also referred to as a first device 110 or a UE 110) and a network device 120 (hereafter also referred to as a second device 120 or a gNB 120). The terminal device 110 may communicate with the network device 120. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Some potential enhancements on enhanced Industrial Internet of Things (IIoT) and Ultra-Reliable Low-Latency Communication (URLLC) have been studied to ensure a compatibility with unlicensed band URLLC/IIoT operation in controlled environment.

It may be required to perform Listen Before Talk (LBT) operation before transmission in unlicensed band according to the regulator requirement in certain regions in order to achieve coexistence fairness with other Radio Access Technologies (RATs) (e.g. NR-U/LAA/WiFi etc.). For this, the equipment shall consider a channel to be occupied as long as other Radio LAN (RLAN) transmissions are detected at a level greater than an energy detection threshold (EDT). The EDT is integrated over the total nominal channel bandwidth of all operating channels used by the equipment.

In general, a large maximum EDT means small maximum output power for a UE according to the regulatory requirement. For URLLC, it makes sense to reduce the maximum output power for fast ED-based LBT operations. For example, the URLLC traffic with small data packet generally requires small transmission bandwidth and thus only needs low transmit power (per MHz) for reliable transmission especially for the cell-center UEs. Even if small maximum output power has adverse impact on the link performance for some cases, other approaches such as link adaption or repetition transmission can be used to ensure the transmission reliability for URLLC traffic with a few data. Therefore, it is reasonable to reduce the maximum output power of UE for fast channel access operation under the constraint of regulatory requirement.

Unlike URLLC, other traffic such as Enhanced Mobile Broadband (eMBB) generally have large amount of data for transmission and need to occupy large channel bandwidth for UL transmission. For this, large maximum output power would be beneficial to improve the critical performance of the corresponding traffic, e.g. throughput performance of eMBB traffic.

In some cases, a UE in NR may need to support mixture transmission of multiple traffics with different traffic priorities. In this case, a larger or a smaller EDT does not benefit the critical performance of all the uplink traffic. For this reason, it is beneficial to take the channel access requirement of different traffic into account during the EDT design. However, current EDTs remain uniform for all UL traffic regardless of the channel access requirement of the traffic in NR-U.

In NR-U and LAA, the setting of LBT parameters such as Contention Window Size (CWS) and Channel Occupancy Time (COT) has already considered the channel access requirements of different uplink traffic. However, the same EDT is adopted in NR-U for channel clearance assessment (CCA) without considering the actual channel access requirement of different uplink traffic.

Therefore, a novel traffic priority-based energy threshold design in NR-U is proposed in the present disclosure. In this solution, the UE may be configured with at least one configuration parameter of energy detection for a given traffic priority. When the UE initiates a UL transmission having the given traffic priority, one of the at least one configuration parameter can be activated for determining the output power level of the UE. Then the transmission may be performed according to the determined output power level. In this way, the maximum EDT can be associated with the traffic priority, to facilitate flexible channel access requirement of different uplink traffic priority.

Figure 2:
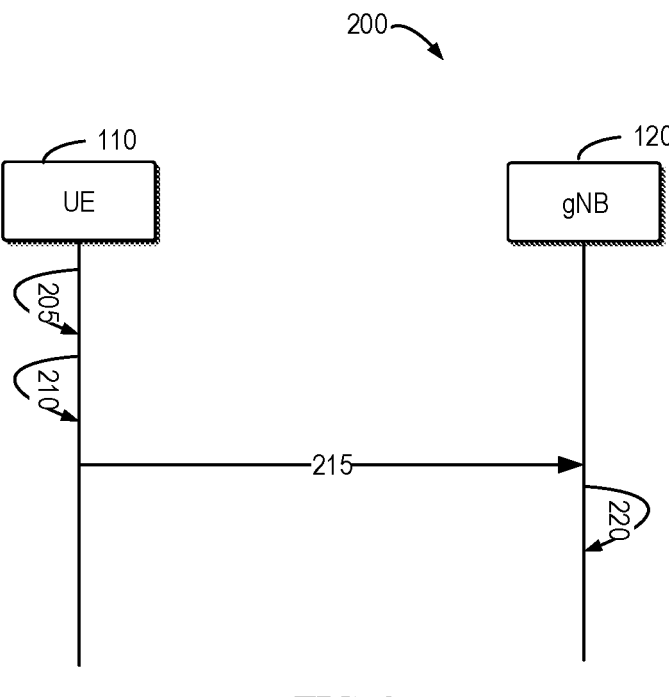
FIG. 2 shows a signaling chart illustrating a process of traffic priority-based energy detection threshold adaption according to some example embodiments of the present disclosure.

Principle and implementations of the present disclosure will be described in detail below with reference to FIGS. 2 to 4. FIG. 2 shows a signaling chart illustrating a process of traffic priority-based energy detection threshold adaption according to some example embodiments of the present disclosure. For the purpose of discussion, the process 200 will be described with reference to FIG. 1. The process 200 may involve the UE 110 and the gNB 120 as illustrated in FIG. 1. It would be appreciated that although the process 200 has been described in the communication network 100 of FIG. 1, this process may be likewise applied to other communication scenarios.

If a data transmission from the UE 110 to the gNB 120 is to be initiated at the UE 110, the UE 110 may determine a traffic priority of the data transmission.

In some example embodiments, the traffic priority of the data transmission may be classified based on traffic type (e.g. eMBB, IoT, URLLC) or 5QI. For example, the network can classify the uplink traffic as the same as the channel access priority class (CAPC). That is, the traffic priority of the data transmission may depend on a type of the data to be transmitted.

As another option, the gNB 120 may indicate the traffic priority in the scheduled grant when uplink transmission for a given traffic priority is scheduled. For this, the UE 110 would transmit the traffic priority in the corresponding scheduling granted resource. Furthermore, the gNB 120 may also indicate the traffic priority in the configured grant configuration. For this, the UE 110 can transmit the traffic priority in the corresponding configured grant resource.

After determining a traffic priority of the data transmission, as shown in FIG. 2, the UE 110 may obtain 205 an indication associated with energy detection for CCA and determine at least one candidate configuration parameter of an energy detection threshold for CCA for the determined target traffic priority based on the indication.

As an option, the indication may comprise K candidate offsets related to a reference energy detection threshold for CCA for the target traffic priority. As another option, the indication may comprise K candidate energy detection thresholds for CCA for the target traffic priority. It is also possible that the indication may comprise K candidate offsets related to a reference power threshold for CCA for the target traffic priority.

In some example embodiments, if the kth candidate offset $$\Delta_{TL}^{n,k}(k = 1 \ldots K, K \geq 1)$$

for a given traffic priority n of the UE 110 related to a reference energy detection threshold is obtained from the indication, the reference energy detection threshold $R_{Thresh\_max}$ can be set to the maximum energy detection threshold $X'_{Thresh\_max}$, which is calculated based on the default maximum energy detection threshold computation procedure.

Then the UE 110 may determine the kth candidate EDT $$X_{Thresh\_max}^{n,k}(k = 1 \ldots K, K \geq 1)$$

for the traffic priority n based on the candidate offsets and the reference energy detection threshold. In some example embodiments, the kth candidate EDT $$X_{Thresh\_max}^{n,k}$$

for the nth traffic priority can be determined as below:

$$X_{Thresh\_max}^{n,k} = \min\left(R_{Thresh\_max} - \Delta_{TL}^{n,k}, T_{max} + \Delta_{max}\right) \quad (1)$$

$$T_{max}(dBm) = \quad (2)$$

$$10 \cdot \log 1\left(3.16228 \cdot 10^{-8}(mW/MHz)(MHz) \cdot BWMHz(MHz)\right)$$

where the $$\Delta_{TL}^{n,k}(k = 1 \ldots K, K \geq 1)$$

is a positive value; BWMHz is the single channel bandwidth in MHz and $\Delta_{max}$ is an offset related to the $T_{max}$.

In this case, if regulatory requirement is defined and NR-U is to coexist with other technology, the offset $\Delta_{max}$ can be set to zeros; otherwise, the offset $\Delta_{max}$ can be predefined or configured for the UE through high layer signalling. For example, the offset $\Delta_{max}$ can be predefined to 10 dB.

In some example embodiments, the kth candidate energy detection threshold $$X_{Thresh\_max}^{n}(k = 1 \ldots K, K \geq 1)$$

or a given traffic priority n of the UE 110 can be obtained from the indication directly.

In some example embodiments, if the kth candidate offset $$\Delta_{power}^{n,k}(k = 1 \ldots K, K \geq 1)$$

9 for a given traffic priority n of the UE 110 related to a reference power value is obtained from the indication, then the UE 110 can determine the kth candidate maximum output power value $$P_{TX}^{n,k}$$

for the given traffic priority based on each power offset $$\Delta_{power}^{n,k}$$

and the reference power. Herein the reference power $R_{power\_max}$ can be the upper bound of maximum output power $P_{CMAX\_H,c}$ for the UE 110.

The candidate maximum output power $$P_{TX}^{n,k}$$

for the traffic priority can be calculated as follows:

$$P_{TX}^{n,k} = R_{power\_max} - \Delta_{power}^{n,k} \qquad (3)$$

where the power offset $$\Delta_{power}^{n,k}$$

can be a positive value; $R_{power\_max}$ is the reference power.

Then the UE 110 may determine candidate energy detection threshold $$X_{Thresh\_max}^{n}$$

for the n traffic priority based the candidate maximum output power value $P_{TX}$ based on the following the default maximum energy detection threshold computation procedure:

$$X_{Thresh\_max}' = \qquad (4)$$

$$\max\left\{ \begin{array}{l} -72 + 10 \cdot \log\ 10(BWMHz/20\ MHz)dbm, \\ \min\left\{ \begin{array}{l} T_{max}, \\ T_{max} - T_A + (P_H + 10 \cdot \log\ 10(BWMHz/20\ MHz) - P_{TX}) \end{array} \right\} \end{array} \right\}$$

where $T_A$=10 dB;

$P_H$=23 dBm;

$P_{TX}$ is the set to the value of $P_{CMAX\_H,c}$ $T_{max}$(dBm)=10·log 1 (3.16228·10$^{-8}$ (mW/MHz)·BWMHz (MHz));

BWMHz is the single channel bandwidth in MHz.

In some example embodiments, the UE 110 may firstly use $$P_{TX}^{n,k}$$

to replace the maximum output power $P_{TX}$ in the default maximum energy detection threshold computation procedure. Then, it can set:

$$X_{Thresh\_max}^{n,k} = X_{Thresh\_max}',$$

where $$X_{Tresh\_max}'$$

was calculated based on default maximum energy detection threshold computation procedure.

Assuming the UE 110 transmits with 23 dBm default maximum output power on 20M channel bandwidth. For the case where the candidate offsets for the traffic priority are configured, for example, two candidate offset values (such as 0 dB and 6 dB offset values) related to the default maximum EDT for uplink CCA of URLLC transmission may be configured. Then the two candidate EDTs (i.e. −72 dBm and −77 dBm) can be determined for uplink CCA of the URLLC traffic by the UE.

For the case where the EDT for the traffic priority are configured, for example, two candidate EDT values (such as −72 dBm and −77 dBm) may be configured for uplink CCA of URLLC transmission.

For the case where the candidate offsets for the traffic priority are configured, for example, two candidate offset values (such as 0 dB and 6 dB offset values) related to the default maximum output power of the UE may be configured. Then the UE may determine two candidate EDTs (i.e. −72 dBm and −77 dBm) for uplink CCA of the URLLC traffic.

In some example embodiments, the candidate parameters for a given traffic priority comprised in the indication may be predefined/pre-configured and the UE 110 may obtain the candidate parameters from pre-configured configuration information. It is also possible that the UE 110 obtains the at least one candidate configuration parameter for the traffic priority through a higher layer signaling or a physical layer signaling.

Before the data transmission starts, as shown in FIG. 2, the UE 110 may determine 210 a target configuration parameter for the data transmission from the at least one candidate configuration parameter. That is, one of the at least one candidate configuration parameter may be activated for the data transmission.

In some example embodiments, the target configuration parameter can be implicitly activated. As an option, the first candidate configuration parameter of the at least one candidate configuration parameter may be determined as the target configuration parameter. As another option, if the UE 110 receives an indication indicating one of the at least one candidate configuration parameter is updated, the UE 110 may determine the updated candidate configuration parameter as the target configuration parameter.

In some example embodiments, the gNB 120 may be triggered to send an indication of an expected configuration parameter in the at least one candidate configuration parameter to be activated to the UE 110.

For example, if the gNB 120 determines a channel access probability for the target traffic priority is lower than a threshold probability, an interference level at the UE side or at the gNB side exceeds a threshold level, a co-channel interference from a further date transmission having a target traffic priority is detected or a channel occupancy time sharing between the gNB 120 and the UE 110 is to be stopped, the gNB 120 may determine an expected candidate configuration parameter from the at least one candidate configuration parameter. Then the gNB 120 may transmit the indication of the expected candidate configuration parameter to the UE 110.

In this case, the activation signalling for the expected candidate configuration parameter can be explicitly indicated to the UE 110 through higher layer signalling or physical signalling. For example, the gNB 120 can configure the UE 110 to activate the expected candidate configuration parameter for a traffic priority through RRC signalling if the channel access probability of the traffic priority is lower than a specified threshold level. Furthermore, in the case of the controlled environment, the gNB 120 may use this solution to coordinate the inter-traffic interference. If eMBB and URLLC traffic are mixed, the gNB 120 can activate a higher energy detection threshold for URLLC.

In some example embodiments, the UE 110 may be triggered to activate one of the at least one candidate configuration parameter on demand. For example, if the UE 110 determines a channel access probability for the traffic priority is lower than a threshold probability or an interference level at UE side exceeds a threshold level, the UE 110 may be triggered to activate the target configuration parameter from the at least one candidate configuration parameter.

In this case, the UE 110 may transmit an indication of the target configuration parameter to the gNB 120, for example, via a Physical signaling such as Uplink Control Information (UCI).

In some example embodiments, a timer can be launched after the target configuration parameter is activated. The UE 110 may obtain a timer for the target configuration parameter. If the UE 110 determines the timer is expired, the UE 110 may update the target configuration parameter. For example, the UE 110 may activate a default configuration parameter, such as the first candidate configuration parameter of the at least one candidate configuration parameter.

In some example embodiments, when multiple traffic priorities are multiplexed for a burst transmission, the UE 110 may determine the target traffic priority for the transmission based on the highest traffic priority of the multiple traffic priorities or the lowest traffic priority of the multiple traffic priorities. Then the UE 110 may determine the target configuration parameter from the at least one candidate configuration parameter for the determined traffic priority.

For example, the lowest traffic priority with the smallest maximum EDT can be considered by default to determine the actual maximum EDT of the multiplexing transmission. It is also possible that the highest traffic priority with the smallest maximum EDT can be considered by default to determine the actual maximum EDT of the multiplexing transmission.

Referring back to FIG. 2, the UE 110 may transmit 215 data to the UE based on the determined target configuration parameter. In order to ensure the fair coexistence with other devices the maximum output power for uplink transmission of a given traffic priority shall be adapted based on the maximum energy detection threshold of the given traffic priority when the requirement is defined.

Thus, in some example embodiments, the UE 110 may perform the CCA based on the target configuration parameter and determine an allowable output power level for the data transmission based on a result of the CCA. The allowable output power level can be considered as a maximum output power level allowed for the data transmission.

Then the UE 110 may transmit the data based on the allowable output power level. That is, an actual output power level for the data transmission may not exceed the allowable output power level.

For example, the UE 110 can reduce its maximum output power of this traffic priority in proportion to the configured maximum energy detection threshold if regulatory requirement is defined for unlicensed spectrum access. The following Equation can be utilized to calculate the maximum output power for a traffic priority for a maximum energy detection threshold $$X^n_{Thresh\_max} : P^n_{TX} = \qquad (5)$$

$$\min\{T_{max} - T_A + (P_H + 10 \cdot \log10(BWMHz/20 \text{ MHz}) - X'_{Thresh\_max}),$$

$$P_{CMAX\_H,c}\}$$

where BWMHz is the single channel bandwidth in MHz; $T_A=10$ dB; $P_H=23$ dBm; $P_{CMAX\_H,c}$ is the default maximum output power value of UE; $T_{max}$ is defined in Equation (2). the value of $P_{CMAX\_H,c}$ denotes the maximum output power of UE, which is defined as follow:

$$P_{CMAX\_H,c} = \{P_{EMAX,c}, P_{PowerClass} - \Delta P_{PowerClass}\} \qquad (6)$$

where
$P_{EMAX,c}$ is the value given by IE P-Max for serving cell c;
$P_{PowerClass}$ is the maximum UE power without taking into account the tolerance;
$\Delta P_{PowerClass}=3$ dB for a power class 2 capable UE operating in Band 41, when P-max of 23 dBm or lower is indicated or if the uplink/downlink configuration is 0 or 6 in the cell; otherwise, $\Delta P_{PowerClass}=0$ dB In some example embodiments, the UE 110 can be configured with a maximum energy detection threshold of −72 dBm for eMBB traffic with a maximum output power of 23 dBm by default. If the UE 110 is configured with a maximum energy detection threshold of −77 dBm for URLLC, it can reduce its maximum output power for URLLC transmission to 18 dBm.

When the gNB receives the data transmitted from the UE 110, the gNB 120 may determine the traffic priority of the data transmission. For example, the gNB 120 may indicate the traffic priority in the scheduled grant when uplink transmission for a given traffic priority is scheduled. For this, the UE 110 would transmit the traffic priority in the corresponding scheduling granted resource. Furthermore, the gNB 120 may also indicate the traffic priority in the configured grant configuration. For this, the UE 110 can transmit the traffic priority in the corresponding configured grant resource.

Then the gNB 120 may determine 220 the allowable output power level for the data transmission based on the traffic priority, for example, based on the default configuration parameter from the at least one candidate configuration parameters, based on the expected configuration parameter determined from the at least one candidate configuration parameters by the gNB 120 or based on a configuration parameter determined from the at least one candidate configuration parameters by the UE 110, etc.

In this way, the maximum EDT can be associated with the traffic priority, to facilitate flexible channel access requirement of different uplink traffic priority. One of the candidate configuration parameter can be activated for a traffic priority by the gNB 120 or/and the UE 110 on demand to adapt the interference environment change and channel access requirement for uplink CCA. Furthermore, the maximum transmit power can be adapted per traffic priority in proportion to the maximum energy detection threshold and thus comply with the regulatory requirements.

Figure 3:
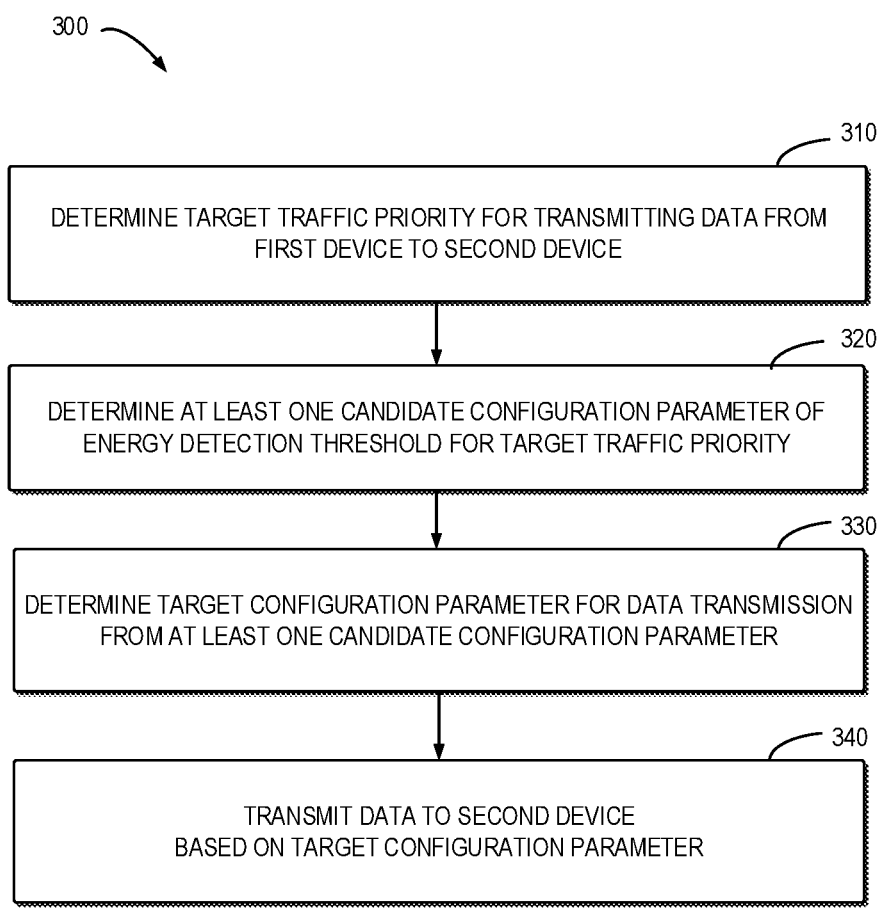
FIG. 3 shows a flowchart of an example method of traffic priority-based energy detection threshold adaption according to some example embodiments of the present disclosure.

FIG. 3 shows a flowchart of an example method 300 of traffic priority-based energy detection threshold adaption according to some example embodiments of the present disclosure. The method 300 can be implemented at the terminal device 110 as shown in FIG. 1. For the purpose of discussion, the method 300 will be described with reference to FIG. 1.

As shown in FIG. 3, at 310, the terminal device determines a target traffic priority for transmitting data from the terminal device to a network device.

At 320, the terminal device obtains at least one candidate configuration parameter of an energy detection threshold for channel clearance assessment for the target traffic priority.

In some example embodiments, the terminal device may receive an indication of at least one of the following: a set of candidate offsets related to a reference energy detection threshold for the channel clearance assessment for the target traffic priority, a set of candidate energy detection thresholds for the channel clearance assessment for the target traffic priority, and a set of candidate offsets related to a reference power threshold of an output power level of the first device. The terminal device may determine the at least one candidate configuration parameter based on the indication.

In some example embodiments, the terminal device may obtain the indication through at least one of the following: pre-configured configuration information, a higher layer signaling, and a physical layer signaling.

At 330, the terminal device determines a target configuration parameter for the data transmission from the at least one candidate configuration parameter.

In some example embodiments, the terminal device may obtain an indication of a reference configuration parameter predetermined for the target traffic priority and determine the target configuration parameter from the at least one candidate configuration parameter based on the indication.

In some example embodiments, the terminal device may determine the target configuration parameter from the at least one candidate configuration parameter based on the index if the terminal device determines an index of a reference configuration parameter from the indication.

In some example embodiments, the terminal device may determine the target configuration parameter from the at least one candidate configuration parameter based on the updating information if the terminal device determines updating information of a reference configuration parameter.

In some example embodiments, the terminal device may receive, from the network device, an indication of an expected candidate configuration parameter to be activated, the expected candidate configuration parameter is selected from the at least one candidate configuration parameter. The terminal device may determine the expected candidate configuration parameter as the target configuration parameter.

In some example embodiments, the terminal device may determine the target configuration parameter from the at least one candidate configuration parameter based on the channel access probability if the terminal device determines an interference level of the terminal device exceeds a threshold level.

In some example embodiments, the terminal device may determine the target configuration parameter from the at least one candidate configuration parameter based on the channel access probability if the terminal device determines a channel access probability for the target traffic priority is lower than a threshold probability.

In some example embodiments, the terminal device may transmit an indication of the target configuration parameter to the second device.

In some example embodiments, the terminal device may obtain a timer for the target configuration parameter and update the target configuration parameter to a reference configuration parameter predetermined for the target traffic priority if the terminal device determines the timer is expired. The timer may indicate an available time period of the target configuration parameter after the target configuration parameter is activated.

In some example embodiments, the data comprises a first data packet and a second data packet, the terminal device may determine the target traffic priority based on one of the following: a first traffic priority of the first data packet, or a second traffic priority of the second data packet, the first traffic priority is higher than the second traffic priority.

At 340, the terminal device transmits the data to the network device based on the target configuration parameter.

In some example embodiments, the terminal device may perform the channel clearance assessment based on the target configuration parameter and determine an allowable output power level for the data transmission based on a result of the channel clearance assessment. The terminal device may transmit the data based on the allowable output power level.

Figure 4:
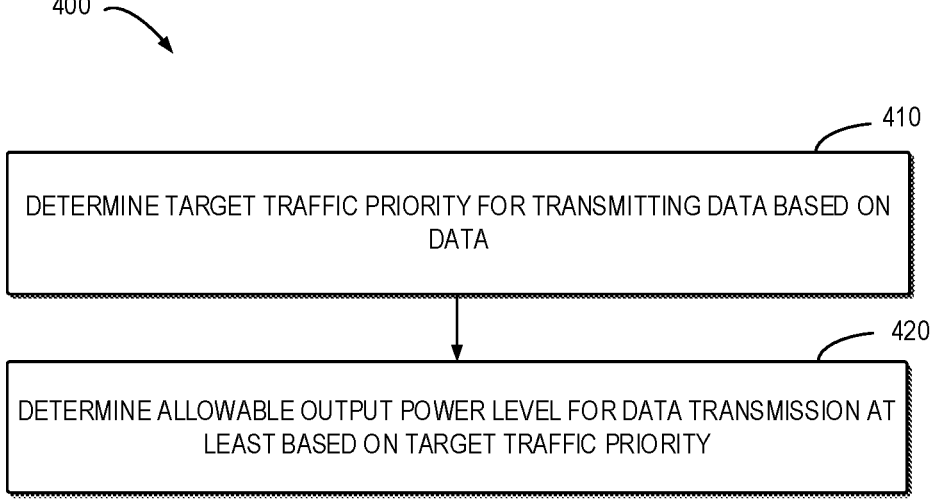
FIG. 4 shows a flowchart of an example method of traffic priority-based energy detection threshold adaption according to some example embodiments of the present disclosure.

FIG. 4 shows a flowchart of an example method 400 of traffic priority-based energy detection threshold adaption according to some example embodiments of the present disclosure. The method 400 can be implemented at the network device 120 as shown in FIG. 1. For the purpose of discussion, the method 400 will be described with reference to FIG. 1.

At 410, if the network device receives, from a terminal device, data transmitted based on a target configuration parameter, the network device determines a target traffic priority for transmitting the data based on the data. The target configuration parameter is associated with at least one candidate configuration parameter of an energy detection threshold for channel clearance assessment for the target traffic priority.

At 420, the network device determines an allowable output power level for the data transmission at least based on the target traffic priority.

In some example embodiments, the data comprises a first data packet and a second data packet, the network device may determine the target traffic priority based on one of the following: a first traffic priority of the first data packet, or a second traffic priority of the second data packet, the first traffic priority is higher than the second traffic priority.

In some example embodiments, the network device may determine determine an expected candidate configuration parameter from the at least one candidate configuration parameter based on at least one of the following: a channel access probability for the target traffic priority being lower than a threshold probability, an interference level at the terminal device exceeding a first threshold level, an interference level at the network device exceeding a second threshold level, a co-channel interference from a further data transmission having a further target traffic priority being detected, and a channel occupancy time sharing between the network device and the terminal device being to be stopped. The network device may also transmit an indication of the expected candidate configuration parameter to the terminal device.

In some example embodiments, the network device may determine, based on the target traffic priority, an expected configuration parameter from the at least one candidate configuration parameter for the target traffic priority; and determine the allowable output power level based on the expected candidate configuration parameter.

In some example embodiments, the network device may receive an indication of the target configuration parameter for the target traffic priority from the terminal device and determine the allowable output power level based on the target configuration parameter.

In some example embodiments, the network device may obtain, based on the target traffic priority, at least one candidate configuration parameter of the energy detection for the target traffic priority. The network device may determine obtain an indication of a reference configuration parameter predetermined for the target traffic priority and determine the reference configuration parameter from the at least one candidate configuration parameter based on the indication. The network device may determine the allowable output power level based on the reference configuration parameter.

In some example embodiments, an apparatus capable of performing the method 300 (for example, implemented at the terminal device 110) may comprise means for performing the respective steps of the method 300. The means may be implemented in any suitable form. For example, the means may be implemented in a circuitry or software module.

In some example embodiments, the apparatus comprises means for determining a target traffic priority for transmitting data from a first device to a second device; means for obtaining at least one candidate configuration parameter of an energy detection threshold for channel clearance assessment for the target traffic priority; means for determining a target configuration parameter for the data transmission from the at least one candidate configuration parameter; and means for transmitting the data to the second device based on the target configuration parameter.

In some example embodiments, an apparatus capable of performing the method 400 (for example, implemented at the network device 120) may comprise means for performing the respective steps of the method 400. The means may be implemented in any suitable form. For example, the means may be implemented in a circuitry or software module.

In some example embodiments, the apparatus comprises means for in response to receiving, from a first device and at a second device, data transmitted based on a target configuration parameter, determining a target traffic priority for transmitting the data based on the data, the target configuration parameter being determined from the at least one candidate configuration parameter of an energy detection threshold for channel clearance assessment for the target traffic priority; and means for determining an allowable output power level for the data transmission at least based on the target traffic priority.

Figure 5:
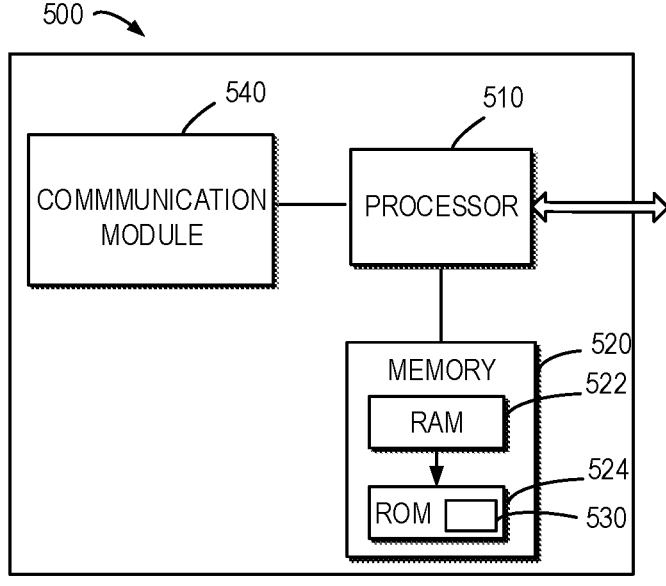
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the terminal device 110 or the network device 120 as shown in FIG. 1. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
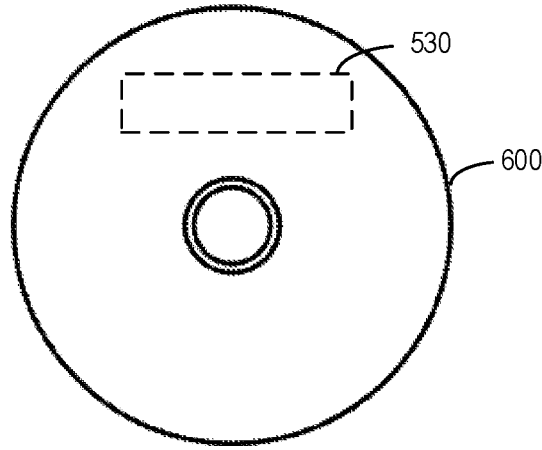
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/ operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes,
the at least one memory and the computer program codes
are configured to, with the at least one processor, cause
the first device at least to:
determine a target traffic priority for transmitting data
from the first device to a second device;
determine at least one candidate configuration parameter of an energy detection threshold for channel
clearance assessment for the target traffic priority;
determine a target configuration parameter for transmitting the data by activating the at least one candidate configuration parameter for the data transmission; and
transmit the data to the second device with an output
power level determined based on the target configuration parameter,
wherein the first device is caused to determine the at least
one candidate configuration parameter by:
receiving an indication of at least the following:
a set of candidate offsets related to a reference energy
detection threshold for the channel clearance assessment for the target traffic priority,
a set of candidate energy detection thresholds for the
channel clearance assessment for the target traffic priority, and
a set of candidate offsets related to a reference power
threshold of an output power level of the first device;
and
determining the at least one candidate configuration
parameter based on the indication,
and, when multiple traffic priorities are multiplexed for a
burst transmission, the first device is further caused to
determine an actual maximum energy detection threshold used for the burst, wherein a lowest traffic priority
with the smallest maximum energy detection threshold
is used to determine the actual maximum energy detection threshold.

2. The first device of claim 1, wherein the first device is
caused to:
obtain the indication through at least the following: preconfigured configuration information, a higher layer
signaling, and a physical layer signaling,
determine the target configuration parameter from the at
least one candidate configuration parameter based on
an index if the first device determines an index of a
reference configuration parameter from the indication,
obtain a timer for the target configuration parameter and
update the target configuration parameter to a reference
configuration parameter predetermined for the target
traffic priority if the first device determines the timer is
expired, wherein the timer indicates an available time
period of the target configuration parameter after the target configuration parameter is activated, wherein the first device obtains the indication through at least one of: pre-configured configuration information, higher-layer signaling, or physical-layer signaling.

3. The first device of claim 1, wherein the first device is caused to determine the target configuration parameter by:

obtaining an indication of a reference configuration parameter predetermined for the target traffic priority; and determining the target configuration parameter from the at least one candidate configuration parameter based on the indication, wherein determining the target configuration parameter from the at least one candidate configuration parameter is based on at least one of: an index of a reference configuration parameter determined from the indication, or updating information of a reference configuration parameter, wherein determining the at least one candidate configuration parameter comprises determining a candidate maximum energy detection threshold $X_{Thresh\_max}$ according to $$X_{Thresh\_max}^{n,k} = \min\left(R_{Thresh\_max} - \Delta_{TL}^{n,k}, T_{max} + \Delta_{max}\right)$$

$$T_{max}(dBm) = 10 \cdot \log 1\left(3.16228.10^{-8}(mW/MHz) \cdot\right)$$

(BWMHz(MHz))

where the $$\Delta_{TL}^{n,k}(k = 1 \ \dots \ K, K \geq 1)$$

is a positive value, BWMHz is the single channel bandwidth in MHz and $\Delta_{max}$ is an offset related to the $T_{max}$.

4. The first device of claim 1, wherein the first device is caused to determine the target configuration parameter by:

receiving, from the second device, an indication of an expected candidate configuration parameter to be activated, the expected candidate configuration parameter being selected from the at least one candidate configuration parameter; and determining the expected candidate configuration parameter as the target configuration parameter.

5. The first device of claim 1, wherein the first device is caused to determine the target configuration parameter by:

in accordance with a determination that a channel access probability for the target traffic priority is lower than a threshold probability, determining the target configuration parameter from the at least one candidate configuration parameter based on the channel access probability, and wherein in response to at least one of: a channel access probability for the target traffic priority being lower than a threshold probability, an interference level at the first device exceeding a first threshold level, an interference level at the second device exceeding a second threshold level, detection of co-channel interference from a further data transmission, or a channel occupancy time sharing between the first device and the second device being to be stopped, activating a different candidate configuration parameter and transmitting an indication of the activated target configuration parameter to the second device via uplink control information.

6. The first device of claim 1, wherein the first device is caused to determine the target configuration parameter by:

in accordance with a determination that an interference level at the first device exceeds a threshold level, determining the target configuration parameter from the at least one candidate configuration parameter based on the interference level.

7. The first device of claim 1, wherein the first device is further caused to:

obtain a timer for the target configuration parameter, the timer indicating an available time period of the target configuration parameter after the target configuration parameter is activated; and in accordance with a determination that the timer is expired, update the target configuration parameter to a reference configuration parameter predetermined for the target traffic priority.

8. The first device of claim 1, wherein the data comprises a first data packet and a second data packet, and wherein the first device is caused to determine the target traffic priority by:

determining the target traffic priority based on:

a second traffic priority of the second data packet, the first traffic priority being higher than the second traffic priority, wherein, when the data comprises packets with different traffic priorities, the first device determines an actual maximum energy detection threshold for the multiplexed transmission such that, by default, the lowest traffic priority with the smallest maximum energy detection threshold is used to determine the actual maximum energy detection threshold.

9. The first device of claim 1, wherein the first device is caused to transmit the data by:

performing the channel clearance assessment based on the target configuration parameter;

determining an allowable output power level for transmitting the data based on a result of the channel clearance assessment; and transmitting the data based on the allowable output power level such that an actual transmit output power level does not exceed the allowable output power level.

10. A second device comprising:

at least one processor; and at least one memory including computer program codes, the at least one memory and the computer program codes are configured to, with the at least one processor, cause the second device at least to:

in response to receiving, from a first device, uplink data transmitted based on a target configuration parameter, determine a target traffic priority for transmitting the uplink data, the target configuration parameter being associated with at least one candidate configuration parameter of an energy detection threshold for channel clearance assessment for the target traffic priority; and determine an allowable output power level for transmitting the uplink data at least based on the target traffic priority, wherein the allowable output power level is determined according to a regulator-driven computation that constrains maximum output power as a function of a maximum energy detection threshold, wherein the second device is further caused to:
determine an expected candidate configuration parameter from the at least one candidate configuration parameter based on at least the following:
a channel access probability for the target traffic priority being lower than a threshold probability,
an interference level at the first device exceeding a first threshold level,
an interference level at the second device exceeding a second threshold level,
a co-channel interference from a further data transmission having a further target traffic priority being detected, and
a channel occupancy time sharing between the first device and the second device being to be stopped; and
transmit an indication of the expected candidate configuration parameter to the first device.

11. The second device of claim 10, wherein the data comprises a first data packet and a second data packet, and wherein the second device is caused to determine the target traffic priority by: determining the target traffic priority based on:
a second traffic priority of the second data packet, the first traffic priority being higher than the second traffic priority.

12. The second device of claim 10, wherein the second device is caused to determine the allowable output power level by:
determining, based on the target traffic priority, an expected configuration parameter from the at least one candidate configuration parameter for the target traffic priority; and
determining the allowable output power level based on the expected configuration parameter.

13. The second device of claim 10, wherein the second device is caused to determine the allowable output power level by:
receiving an indication of the target configuration parameter for the target traffic priority from the first device; and
determining the allowable output power level based on the target configuration parameter.

14. The second device of claim 10, wherein the second device is caused to determine the allowable output power level by:
obtaining, based on the target traffic priority, at least one candidate configuration parameter of the energy detection for the target traffic priority;
obtaining an indication of a reference configuration parameter predetermined for the target traffic priority;
determining the reference configuration parameter from the at least one candidate configuration parameter based on the indication; and
determining the allowable output power level based on the reference configuration parameter.

15. A method comprising:
determining a target traffic priority for transmitting data from a first device to a second device;
determining at least one candidate configuration parameter of an energy detection threshold for channel clearance assessment for the target traffic priority;
determining a target configuration parameter for transmitting the data based on the at least one candidate configuration parameter; and transmitting the data to the second device based on the target configuration parameter,
wherein determining the at least one candidate configuration parameter comprises:
receiving an indication of at least the following:
a set of candidate offsets related to a reference energy detection threshold for the channel clearance assessment for the target traffic priority,
a set of candidate energy detection thresholds for the channel clearance assessment for the target traffic priority, and
a set of candidate offsets related to a reference power threshold of an output power level of the first device; and
determining the at least one candidate configuration parameter based on the indication,
and, for a data transmission that multiplexes multiple traffic priorities in a burst, determining an actual maximum energy detection threshold used for the burst, wherein a lowest traffic priority with the smallest maximum energy detection threshold is used to determine the actual maximum energy detection threshold.

16. The method of claim 15, wherein the method further comprises:
obtaining the indication through at least the following: pre-configured configuration information, a higher layer signaling, and a physical layer signaling,
determining the target configuration parameter from the at least one candidate configuration parameter based on an index if the first device determines an index of a reference configuration parameter from the indication,
obtaining a timer for the target configuration parameter and update the target configuration parameter to a reference configuration parameter predetermined for the target traffic priority if the first device determines the timer is expired, wherein the timer indicates an available time period of the target configuration parameter after the target configuration parameter is activated.

17. The method of claim 15, wherein determining the target configuration parameter comprises:
obtaining an indication of a reference configuration parameter predetermined for the target traffic priority; and
determining the target configuration parameter from the at least one candidate configuration parameter based on the indication.

18. The method of claim 15, wherein determining the target configuration parameter comprises:
receiving, from the second device, an indication of an expected candidate configuration parameter to be activated, the expected candidate configuration parameter being selected from the at least one candidate configuration parameter; and
determining the expected candidate configuration parameter as the target configuration parameter.

19. The method of claim 15, wherein determining the target configuration parameter comprises:
in accordance with a determination that a channel access probability at the target traffic priority is lower than a threshold probability, determining the target configuration parameter from the at least one candidate configuration parameter based on the channel access probability.

* * * * *